United States Patent [19]

Higuchi et al.

[11] Patent Number: 4,474,473
[45] Date of Patent: Oct. 2, 1984

[54] METHOD AND EQUIPMENT FOR MANUFACTURING PIGMENT DISPERSION

[75] Inventors: Hiroshi Higuchi; Takayuki Kurahashi, both of Hyogo; Naohiko Mushiake; Yoichi Taniguchi, both of Osaka, all of Japan

[73] Assignees: Sakata Shokai Ltd.; Sumika Color Co., Ltd., both of Osaka, Japan

[21] Appl. No.: 506,885

[22] Filed: Jun. 21, 1983

[30] Foreign Application Priority Data

Jun. 28, 1982 [JP] Japan ................ 57-112375

[51] Int. Cl.³ ................ B29B 1/10
[52] U.S. Cl. ................ 366/75; 366/85; 366/139; 366/301; 366/318; 425/208; 425/209
[58] Field of Search ........... 366/79, 75, 8, 83–86, 366/301, 91, 138, 139, 96, 97, 154, 155, 177, 181, 156, 158, 318, 605, 319–324; 425/207–209

[56] References Cited

U.S. PATENT DOCUMENTS 3,802,670  4/1974  Okada et al. ............ 366/84 X
3,873,474  3/1975  Ficker ................ 366/85 X
4,054,271 10/1977  Lanzillo ................ 366/85 X

FOREIGN PATENT DOCUMENTS 50-51532  5/1975  Japan.

Primary Examiner—Timothy F. Simone
Attorney, Agent, or Firm—Wenderoth, Lind & Ponack

[57] ABSTRACT

Pigment dispersion is manufactured by continuously flushing pigment press-cake. First and second troughs supply hydrophobic liquid organic media and the pigment wet-cake respectively at a constant rate to a twin screw co-rotating extruder having a L/D (length/diameter) value of 25 or more. The twin screw co-rotating extruder includes a feeding part where the hydrophobic liquid organic media and the pigment wet-cake are fed from the first and second troughs, a flushing part for flushing the pigment particles from water phase to form an organic medium phase, and a dehydrating part for removing water from the flushed mixture. The hydrophobic liquid organic media and the pigment wet-cake are fed to the twin screw co-rotating extruder, and the pigment press-cake is flushed and dehydrated continuously in the extruder to obtain the pigment dispersion.

11 Claims, 3 Drawing Figures

METHOD AND EQUIPMENT FOR MANUFACTURING PIGMENT DISPERSION

BACKGROUND OF THE INVENTION

1. Field of the Invention

The present invention relates to a method and an apparatus or equipment for manufacturing pigment dispersion by continuously flushing pigment press-cake by using a twin screw extruder, and more particularly relates a method and equipment for continuously flushing and dehydrating in the extruder in order to obtain effectively high quality, namely low water content, pigment dispersion having fine pigment particles.

2. Description of the Prior Art

Conventionally, methods for manufacturing printing inks, paints and various conditioned colorants for plastics were roughly divided into processes of using powder pigments and processes of using pigment press-cakes. In the former case, since the pigment elementary particles coagulate firmly in the drying process, it is difficult to disperse them into elementary particles even by subsequent strong dispersion or kneading, which often results in inferior color value and transparency. In the latter case, an organic medium such as a water-immissible binder is added to pigment particles in the pigment press-cake which do not coagulate as much, and the mixture is violently kneaded to flush the pigment particles from the water phase to the organic medium phase, which is used as pigment dispersion, so that the pigment in a state close to elementary particles may be directly used. As a result, the color value and transparency are excellent, and this method is used widely.

However, conventional flushing is carried out by the so-called batch process, which involves the following problems. For example, when producing printing inks, pigment presscakes and ink binders are charged into a flusher possessing a trough of large capacity, and agitator blades are powerfully rotated with a large power to knead and flush the pigment. Then water is removed by decantation, and the residue is heated and dehydrated under vacuum to obtain pigment dispersions.

In this method, very large equipment is required as compared with the final output of pigment dispersions, much time and large power are necessary for kneading and flushing, the flushing product is in dough form which is low in efficiency of vacuum dehydration and takes a long time for dehydration, and the actual water content is around 3%, even if dehydrated for a long period of time, and is difficult to reduce below 1%. Since the batch system is employed, it is difficult to obtain flushing products of a uniform quality. Additionally, the operating procedure is complicated, and it is practically difficult to obtain high pigment loaded dispersions.

As a means of solving these problems of batch process flushing, there are proposals relating to continuous flushing. For example, Japanese Patent Application Public Disclosure No. 50-51532 discloses using a line mixer. According to this method, although the problems peculiar to the conventional batch process can be solved, since the line mixer is a static mixing device and continuous flushing is possible, dehydration is achieved by batch processing (again it is difficult to lower the water content below 1%). Hence this method is not a completely continuous process. Besides, because the line mixer is a device to continuously agitate and mix fluids within its transport line, it is essential that the object possess fluidity, and it becomes necessary to dilute and adjust the pigment press-cakes or to add special surfactants, which involves problems in efficiency and product quality.

In the conventional batch process flushing, since the materials are processed in one container, feeding problems do not usually occur, but it is important in the continuous operation to feed each material uniformly while maintaining a constant feeding flow rate.

The conventionally used pigment press-cakes are wet cakes with pigment content of 15 to 35% presenting a plaster-like form, and are prone to plastic deformation, lacking in uniformity of pigment content. This form is very disadvantageous for constant feeding. Therefore, emphasizing only the continuous constant feeding property, it is sufficient to dilute the cake in water to feed in surry form as shown in the aforesaid Japanese Patent No. 50-51532. But in this method, the treating volume increases and the flushing efficiency decreases, which may lead to lower productivity.

SUMMARY OF THE INVENTION

In order to solve the problems of the flushing methods mentioned above, the object of the present invention is to provide a method and equipment for producing pigment dispersions by feeding fixed amounts of hydrophobic liquid organic media and pigment wet-cake into a twin screw co-rotating extruder having a L/D (length/diameter) value of 25 or more, and performing flushing, dehydrating, and, if necessary, after-treating continuously within extruder.

The twin screw co-rotating extruder of the present invention is composed of functional barrels forming, at least, a feeding section, a flushing section, a dehydrating section, and a vacuum hydrating section, and each section includes a barrel and screws having grooves.

When executing the method of to this invention, it is most effective to use specifically prescribed pigment water-based press-cakes with a pigment content of 35% or more.

According to the present invention, by using a screw extruder possessing specific functions and also using pigment water-based press-cakes in special form and hydrophobic organic liquid media, it is possible to flush efficiently and rapidly within a limited area of the extruder and within a limited time at an excellent feeding stability, and the subsequent dehydration and other operations can be continuously carried out within the extruder, so that high quality, namely low water content, pigment dispersion having fine pigment particles may be continuously manufactured.

DETAILED DESCRIPTION OF THE PREFERRED EMBODIMENT

Figure 1:
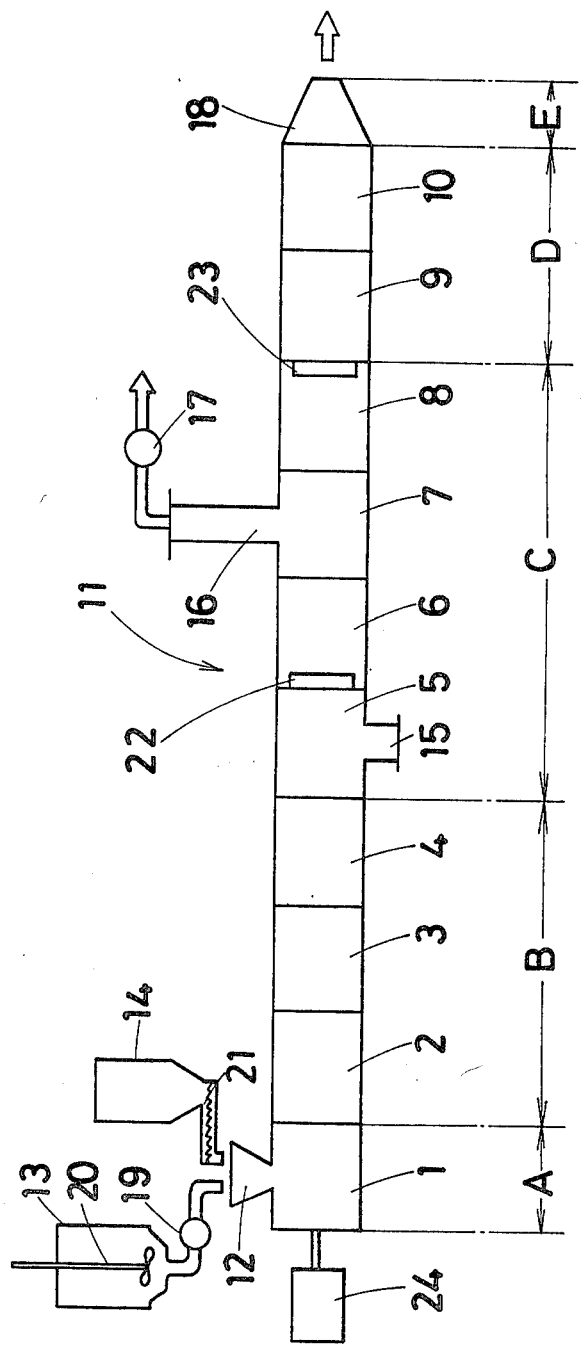
FIG. 1 is a schematic diagram of one embodiment of a twin screw co-rotating extruder used in the present invention.

The present invention relates to a method and an apparatus or equipment for manufacturing pigment dispersions wherein pigment wet-cakes are continuously flushed by using a twin screw extruder. More particularly, it is intended to obtain high quality, namely low water content, pigment dispersion efficiently by performing flushing and dehydrating operations continuously in the extruder.

In the production of pigment dispersions according to this invention, the combination of the function of the screw extruder being used, the form of the pigment wet-cakes, and the composition of hydrophobic liquid organic media are extremely important.

Types of screw extruders include a single screw extruder, a twin screw extruder, and a multiscrew extruder (satellite type). These types were studied by the inventors with respect to the continuous production of pigment dispersions. As a result, it was determined that in the single screw extruder, the transportation of the material being treated in the extruder was unstable, retention of the material easily occurred, the material lacked uniformity, and it was difficult to knead the pigment and organic media effectively during flushing of the pigment in the pigment press-cake into the organic media. In the multiscrew extruder, on the other hand, although the results were equal to, or even better than, depending on the models, those of the twin screw extruder, the structure was too complicated and the enhancement of the functions was not so high as to justify the high cost of the equipment.

In the twin screw extruder, the performance differed depending on the screw rotation direction, self-cleaning function, and screw profiles. Regarding the rotating direction, there are counter-rotating screws and co-rotating screws. In the co-rotating type, as compared with the counter-rotating type, the mixing and kneading function was excellent, and effective blending between the pigment and organic media when flushing and high speed processing were possible. In the non-self cleaning type, the stability of feed and surface renewing action of the screws were found to be inferior. Therefore, in execution of the method conforming to the present invention, a twin screw co-rotating extruder possessing a self-cleaning function proved to be effective.

Since the intent of the present invention is to feed the pigment press-cakes and organic media into the extruder and to flush them in such extruder, the condition of the materials is largely changed in the extruder, and it is important to design the screw profiles according to the purpose. Preferably, as described more particularly below, the twin screw co-rotating extruder should be composed of function addressed barrels forming at least the feeding part, flushing part, dehydrating part, and vacuum dehydrating part, with each part possessing suitable barrel and screw profiles.

Reference now will be made to the form and method of feeding of pigment press-cakes and hydrophobic organic liquid media. In the conventional batch process, although feeding problems did not occur because all materials were treated in the same container, it is important in a continuous operation to feed the materials uniformly while maintaining a constant rate of each material.

The pigment press-cakes used conventionally are wet cakes with a pigment content of 15 to 35%, presenting a form resembling plaster or sludge, and are susceptible to plastic deformation and lack uniformity of the pigment content. This is a very disadvantageous form when attempting constant flow feeding. Therefore, in consideration of constant feeding alone, it is sufficient to dilute the cake in water to supply in slurry form as disclosed in the aforesaid Japanese patent No. 50-51532. However, to the contrary, the treating amount increases and the flushing efficiency decreases in such a method, which may lead to reduction of productivity.

Accordingly, in the present invention, it is more effective to use a specially prescribed pigment press-cake with a pigment content of 35% or more. A press-cake with a pigment content of 35% or higher apparently presents a form of lump cake, but which performs as a wet-cake, and it excels in both uniformity of pigment content and constant flow feeding property. A pigment wet-cake with a pigment content of 35% or more may be obtained, for example, by modifying the method disclosed in Japanese Patent Application Public Disclosure No. 57-53568, which method consists of shaping the low concentration pigment wet-cake prepared by conventional methods into a form easy to dry, by immediately or afterwards drying under relatively moderate conditions such as air circulation until the desired water content is achieved. The pigment content of the wet-cake used in the present invention should be 40% or more with pthalocyanine pigment, and 35% or more with azo pigment, preferably 50% or more with a maximum limit of 80%.

As the hydrophobic organic liquid media to be used in flushing of pigment in the press-cake, liquid resins, resins dissolved in hydrophobic organic solvents, or organic solvents used for printing inks, paints and various conditioned colorants may be used.

Practical examples of such hydrophobic organic liquid media may include mixed varnishes of at least one of alkyd resin, phenol resin, ester resin, petro resin, maleic resin and their rosin modified resins, with linseed oil, tung oil, safflower oil and other vegetable oils, and/or mineral oils.

The examples may also include mixtures of at least one of polyamide resin, maleic resin, polyvinyl chloride resin, vinyl acetate resin, vinyl chloride/vinyl acetate copolymer resin, chlorinated polyolefines, petro resin, polystyrene, resin, acrylic resin, urethane resin, and keton resin, being dissolved in hydrophobic organic solvents.

The resins, if they are liquid, may be directly used as hydrophobic organic liquid media.

Although less liquid organic media may be directly supplied into the extruder together with the pigment press-cake, the following inconveniences may occur depending on the means of feeding. That is, when the organic media and pigment press-cake are supplied to the same feed port by the same feeder flushing occurs between the two materials, and the mixture becomes like dough, thereby impeding the constant volume feeding property. As a result, a powerful forced feeder may be required, or the chance of blending of the two materials may be reduced due to dough forming, or a large power or a long time may be required for flushing, or the intended treatment may not be achieved within a limited area in the extruder or within a limited time.

In the present invention, in order to solve these problems, it is effective that the organic liquid media is added when the constant feeding of the pigment press-cake is accomplished, or that a mixture of the organic media and a water-based media is added to cause contact with the pigment press-cake in the form of the mixture. The mixing ratio of the two materials should be determined depending on the properties of the organic media. It is fundamentally necessary that the water-based media should be 0.25 to 1.5 parts by volume with respect to 1 part by volume of organic media, and the mixture may be obtained by using an ordinary dissolving device. If the ratio is out of this range, a stable mixture may not be obtained, or some inconvenience may result in the constant feeding or efficient flushing. If the form of mixture is of the o/w type, flushing may take a long time. Therefore, a mixture of the w/o type should be preferable.

Hereinafter, a method conforming to the present invention is described more practically by referring to the drawings.

Figure 2:
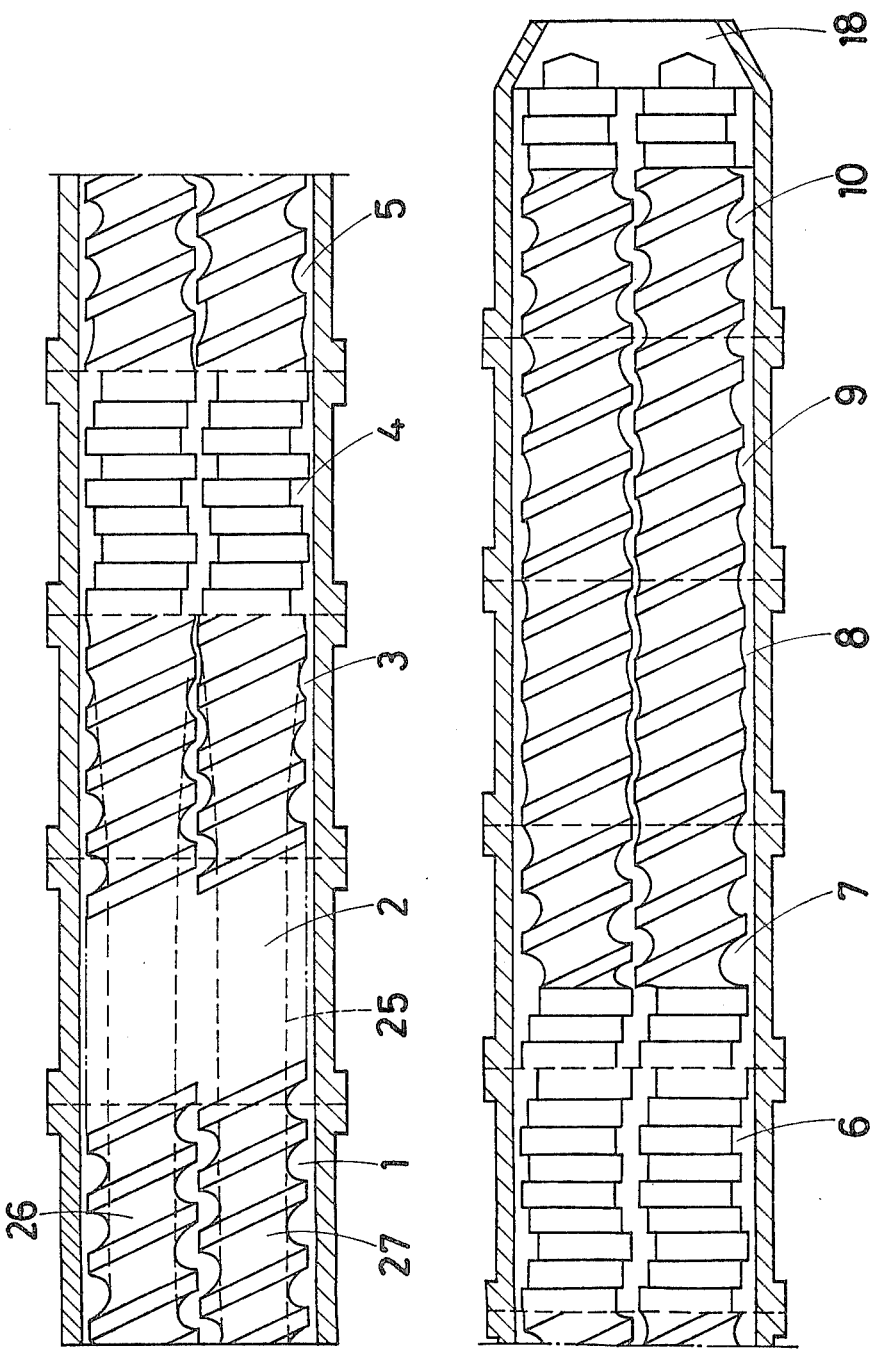
FIG. 2 is a horizontal sectional view of a barrel of the twin screw extruder.

FIG. 1 is a schematic diagram of one embodiment of the twin screw co-rotating extruder used in the present invention. In the drawings, a twin screw co-rotating extruder 11 includes a housing formed by ten barrels 1 to 10. FIG. 2 is a horizontal sectional view of the extruder. A pair of screws 26, 27 having surface grooves or channels are given to rotate in the same rotational direction by driving means 24 shown in FIG. 1. In FIG. 1, a feed section or part A is formed by barrel 1, a flushing section or part B by barrels 2 to 4, a dehydrating section or part C by barrels 5 to 8, and an after-treating section or part D as required by barrels 9 and 10. The materials to be treated are extruded from outlet 18 of a nozzle E.

A tank or trough 13 for supplying hydrophobic organic liquid media may be equipped with an agitator 20 or a metering pump 19 for constant feed. There is another tank or trough 14, which is for supplying the wet-cake with high pigment content, and a forced constant feeder 21 may be provided if necessary. In FIG. 1, both materials are supplied from one feed port by using constant feeders, but it is also possible to feed them from individual feed ports, or to feed while mixing them at a constant volume from the individual troughs to the feed port. Therefore, the feeding method should be determined in consideration of the type of materials and the properties, shape and function of the screw extruder.

Figure 3:
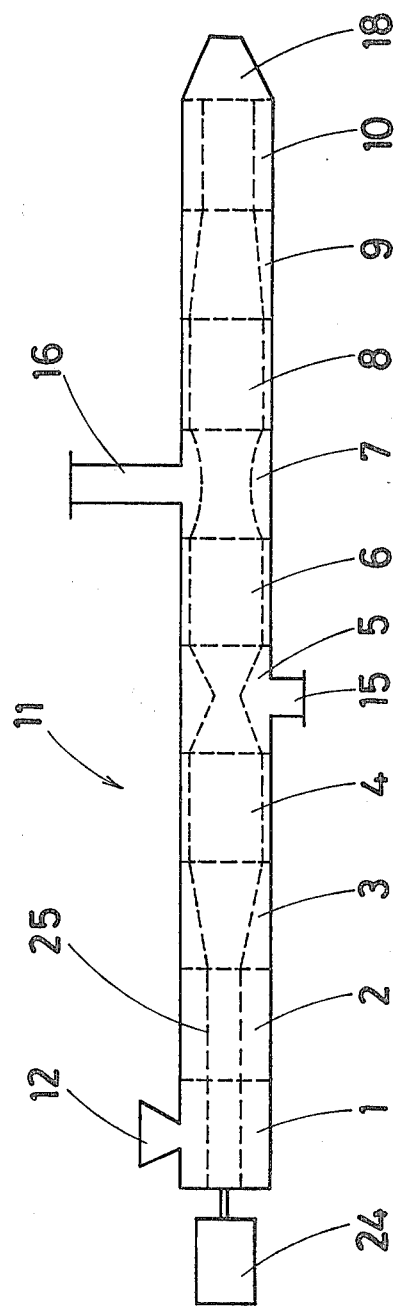
FIG. 3 is a diagrammatic vertical sectional view of the twin screw co-rotating extruder showing the depth of the channel or groove of the screw in each barrel.

Thus, both of the materials are supplied into the feed part A of the screw extruder 11. The feed part A is the section for feeding the materials to be treated to the next section, i.e. flushing part B. As the screw of the feed part, a relatively deep channel depth screw seems to be suitable. In FIG. 1 the feed part is composed only of barrel 1, but two or more barrels may be used, or it is also possible to connect material feed ports to different barrels to supply the materials from the individual barrels. FIG. 3 is a diagramatic vertical sectional view of the twin screw co-rotating extruder. The imaginary lines show the depths of the channels or grooves in the respective length sections of the screws.

The flushing part B comprises three barrels 2 to 4 in this section, the hydrophobic organic media and the pigment in the wet-cake should be sufficiently kneaded to be flushed completely. Therefore, the screws in the flushing part B must possess sufficient mixing, kneading, and surface renewing functions. For performing more effective kneading, a special type of screw composed of a plurality of kneading disks may be employed (barrel 4). The screw profile should be preferably designed in a taper form in barrel 3 tapering from the same deep channel (barrel 2) as used in the feeding part gradually to a shallow channel, especially in order to flush completely in the barrel 3 and to link smoothly to the dehydrating part C as shown in FIG. 3. At this time, if the organic media for flushing are not mixed with water-based media or if the pigment wet-cake does not contain a high pigment content, much time and power is required for kneading, and sufficient flushing is not possible unless more barrels are employed and the area for flushing is widened. Therefore it is efficient to use the materials of the present invention.

Also, the rotating speed of the screw is another important factor, and it is essential to determine it in consideration of the flushing speed. Although there is a difference due to the length/diameter (L/D) ratio of the screw, the preferable range of screw rotating speed is 150 to 350 rpm, and more preferably within 200 to 300 rpm, to enhance the mixing and kneading effect and treating at high speed.

After sufficient flushing, the material passes to the dehydrating part C. In the drawings, the dehydrating part C is composed of four barrels 5 to 8. A vent 15 is provided in the barrel 5, and the majority of water resulting from flushing is removed from vent 15.

The screws in the barrel 5 preferably should have relatively shollow channels, and it is important for the separation of water to use special screws having deep channels only in the middle part of the barrel as shown in FIG. 3.

The barrels 6 to 8 are responsible for removing the residual water in the materials by force. For performing more effective kneading, a special type of screw composed of a plurality of kneading disks may be employed (barrel 6). It is preferable to use pressure seals 22, 23 in order to reduce the pressure effectively. Effective pressure sealing methods include the reverse pitch screw block type and the tapered shallow channel screw block type.

It is necessary to connect a vacuum pump 17 to a vent 16 of barrel 7 for carrying out dehydration under reduced pressure with heating. The profile of the screw used for the dehydrating part has a shallow channel, especially in the vacuum dehydration part of barrel 7 as shown in FIG. 3. It is necessary to enhance the efficiency of vacuum dehydration by using a shallow channel screw and shaping the material to be treated in a thin layer form.

After dehydration, the material may be directly extruded from the outlet 18. However, various after-treatments should be necessary depending on the type of the pigment being used. For example, pigments possessing water of crystallization [such as Carmine 6B (CI Red 57) and Watchung Reds (CI Red 48)] require a baking process in order to remove water of crystallization. It may be also necessary to adjust the color concentration, consistency or shade by adding a third substance to the pigment dispersion after treatment.

The after-treatment part D following the dehydrating part C is provided for such necessary operations. The drawing do not describe special feed ports or vents, which are omitted because they are provided according to various purposes and may be easily determined.

Meanwhile, in execution of the method of the present invention, it is important to set the temperature distribution of each part of the screw extruder, so that cooling and heating may be done in each barrel unit depending on the characteristics of the pigment being used.

In production of pigment dispersion using an ordinary pigment, the temperature of the feeding part and flushing part should be set within 20° to 50° C. In the dehydrating part, especially in the vacuum dehydrating part, dehydration should be performed while adjusting the degree of vacuum and heating temperature, and a proper temperature may be set if after-treatment including baking is required.

The L/D value of the screw extruder should be 25 or more, preferably 30 or more. If the L/D value is less than 25, sufficient treatment may not be done in one pass, or problems may occur in the stability or uniformity of quality.

As described above, according to the present invention, all problems related to the conventional batch process or line mixer methods can be solved. Moreover, pigment dispersions of high pigment concentration having stable quality and high dehydrating efficiency may be obtained at high speed, with less energy, and continuously in one machine.

Furthermore, by connecting a continuous kneading equipment or the like to the end of the screw extruder, final products of printing inks, paints or various conditioned colorants may be continuously manufactured in a series of processes.

Experiments of the present invention are shown below.

Experiment 1

A twin screw co-rotating extruder of screw diameter of 50 mm, L/D value of 32, and speed of 200 rpm was used, and the barrels were connected, and the screws and temperatures were as shown in Table 1.

TABLE 1

| Function | Feeding part | Flushing part | Dehydrating part | Vacuum dehydrating part | | Baking part | Metering part | Discharging part |
|---|---|---|---|---|---|---|---|---|
| Barrel No. | 1 | 2 | 3 | 4 | 5 | 6 | 7 | 8 | — |
| Vent | — | — | — | Provided | — | Provided | Provided | — | — |
| Screw profile | Deep channel | Deep channel | Deep-shallow tapered channel | Shallow channel | Shallow channel with pressure seal | Shallow channel with pressure seal | Shallow channel | Shallow channel | — |
| Temperature setting °C. | 40 | 40 | 40 | 40 | 80 | 80 | 110 | 110 | 110 |

As the pigment wet-cake, a press-cake of Carmine 6B (Pigment Red 57) with a pigment content of 40% was used. As the hydrophobic organic liquid medium, alkyd resin varnish was used. The former and the latter were supplied at 10 kg/hr and 6 kg/hr respectively, into a constant feeder. The reducing pressures of the barrels 5,6 were set at 600 mmHg (gauge). In this preparation, a flushing base for offset ink of 40% pigment concentration was manufactured in one pass of the extruder.

First, when both of the materials were preliminarily mixed and fed into a feed port provided in the barrel 1, dough was formed, and could not be fed constantly. When the materials were allowed to contact with each other at the feed port, the feeding pocket of the feed port was plugged, and smooth feeding was impeded. Constant feed was possible only when a particularly powerful enforced feeder was used.

Then, only the pigment press-cake was constantly fed into a feed port in the barrel 1, and the organic liquid medium was supplied from a metering pump when the constant feeding of the pigment press-cake was accomplished in the extruder, by providing a new feed port in the barrel 2. In this method, the materials were supplied smoothly, but the water removed at barrel 4 was colored and turbid.

Accordingly, a barrel possessing the same screw as that of barrel 2 was additionally connected between the barrels 2 and 3, and the same operation was conducted. As a result, water of less coloring and no turbidity could be removed from the barrel 4.

When an alkyd resin varnish was used directly, it was necessary to use a forced feeder or to install various feed ports, which required a longer time and wider area for flushing.

In another method, on the other hand, 100 parts water was added to 100 parts alkyd resin varnish, and the mixture of w/o type was supplied from one feed port at a rate of 12 kg/hr. In this method, an extremely stable constant feed was achieved. In particular, without adding a new barrel for flushing, water of less coloring and no turbidity could be removed from the barrel 4.

By supplying the materials into the twin screw extruder in this method and treating as required, a high quality flushing base of 0.5% water content and having fine pigment particles could be obtained continuously.

When the flushing base obtained by this method was compared with the product from conventional batch process, it was excellent in the following points as shown in Table 2.

TABLE 2

| | Present method | Batch process |
|---|---|---|
| water content | 0.5% | 3.1% |
| Pigment particles | Fine particles under 4 microns | containing coarse particles over 4 microns |
| Color value | same as Batch process | same as Present method |
| Transparency | same as Batch process | same as Present method |
| Pigment content | 40% | under 33% |

As a control test, when the conventional low pigment content wet-cake (25%) and the alkyd resin varnish were used, constant feed was difficult even when a forced feeder was used, the flushing efficiency was low, and a flushing base of uniform properties could not be obtained.

Consequently, it was necessary to supply the alkyd resin varnish as a mixture of w/o type, and more barrels were required for flushing.

Experiment 2

Using a twin screw co-rotating extruder of screw didameter of 50 mm, L/D value 40, and speed 250 rpm, the parameters were as shown in Table 3.

TABLE 3

| Function | Feeding part | | Flushing part | | Dehydrating part | Vacuum dehydrating part | | | Baking part | Metering part | Discharging part |
|---|---|---|---|---|---|---|---|---|---|---|---|
| Barrel No. | 1 | 2 | 3 | 4 | 5 | 6 | 7 | 8 | 9 | 10 | — |
| Vent | — | — | — | — | Provided | — | Provided | — | Provided | — | — |
| Screw profile | Deep channel | Deep channel | Deep channel | Deep-shallow tapered channel | Shallow channel | Shallow channel with pressure seal | Shallow channel | Shallow channel with pressure seal | Shallow channel | Shallow channel | — |
| Temperature setting | 45° C. | 45° C. | 45° C. | 45° C. | 45° C. | 60° C. | 80° C. | 110° C. | 110° C. | 110° C. | — |

As the pigment wet-cake, Carmine 6B with 50% pigment content was used. As the hydrophobic organic liquid medium, a mixture of 100 parts phenol resin varnish and 75 parts water was used. The press-cake and medium were preliminarily mixed at 10 kg/hr and 16 kg/hr, and fed constantly from the feed port in the barrel 1. The reducing pressure at the barrel 7 was set at 600 mmHg (gauge), and a flushing base for offset ink with pigment content of about 35% was manufactured in one pass. As a result, a uniform flushing base of water content of less than 0.5% was obtained.

The quality of the flushing base was similar to the result obtained in experiment 1.

Experiment 3

The same twin screw co-rotating extruder as used in Experiment 2 was used, and one barrel for feeding was additionally installed between barrels 1 and 2. A flushing base was produced by the following method.

As the pigment wet-cake, Carmine 6B with 35% pigment content was used. As the hydrophobic organic liquid medium, phenol resin varnish was used. The press-cake was constantly fed at 20 kg/hr from the feed port in the barrel, and the medium at 14.5 kg/hr from the feed port in the additional barrel. In this arrangement, a flushing base for offset ink with a pigment content of about 33% was obtained at a rate of 21.5 kg/hr in one pass.

The water content of the obtained flushing base was less than 0.5%, and its quality was the same as that obtained in experiment 1.

What is claimed is:

1. A method of manufacturing pigment dispersion, said method comprising:
   providing a twin screw extruder including a housing having therein a pair of adjacent parallel screws, with the ratio of the length of said housing to the inner diameter thereof being at least 25, and with said extruder including an upstream feed section, a flushing section downstream of said feed section and a dehydrating section downstream of said flushing section;
   feeding a hydrophobic liquid organic media by a first feeding means and feeding pigment wet-cake by a second feeding means, at a constant rate, into said feed section of said extruder;
   rotating said pair of screws in the same direction within said housing and thereby sequentially:
   transferring said media and said wet-cake from said feed section to said flushing section and therein continuously flushing pigment particles from a water phase to an organic medium phase by rotation of said pair of screws, thus forming a flushed pigment mixture; and
   transferring said flushed pigment mixture from said flushing section to said dehydrating section and therein continuously dehydrating said mixture by rotation of said pair of screws, said dehydrating comprising removing a majority of the water from said mixture through a first vent in said dehydrating section of said housing, and removing residual water from said mixture through a second vent in said dehydrating section of said housing by applying vacuum thereto, and thereby forming pigment dispersion.

2. A method as claimed in claim 1, wherein said hydrophobic liquid organic media comprises a mixture of from 0.25 to 1.5 parts of water based media per 1 part of organic media by volume.

3. A method as claimed in claim 1, wherein said wet-cake comprises at least 35% pigment.

4. An apparatus for manufacturing pigment dispersion, said apparatus comprising:
   a twin screw extruder including a housing having therein a pair of adjacent parallel screws, the ratio of the length of said housing to the inner diameter thereof being at least 25, said extruder including an upstream feed section, a flushing section downstream of said feed section and a dehydrating section downstream of said flushing section, said feed section including a feeding port;
   first feeding means for feeding a hydrophobic liquid organic media at a constant rate to said feeding port, and second means for feeding pigment wet-cake at a constant rate to said feeding port, and thereby supplying said media and said wet-cake into said feed section of said extruder;
   means for rotating said pair of screws in the same direction within said housing and thereby for sequentially transferring said media and said wet-cake from said feed section to said flushing section and therein continuously flushing pigment particles from a water phase to an organic medium phase, thus forming a flushed pigment mixture, and then transferring said mixture from said flushing section to said dehydrating section and therein continuously dehydrating said mixture, thus forming pigment dispersion;
   said dehydrating section having first vent means for removing a majority of water from said mixture; and
   said dehydrating section having second vent means, adapted to be connected to a source of vacuum, for removing residual water from said mixture.

5. An apparatus as claimed in claim 4, wherein said housing is formed of a plurality of connected barrels.

6. An apparatus as claimed in claim 4, further comprising grooves in said screws, said grooves in said feed section being deeper than in said dehydrating section, and said grooves in said flushing section tapering outwardly from said grooves in said feed section to said grooves in said dehydrating section.

7. An apparatus as claimed in claim 4, wherein said rotating means comprises means for rotating said screws in the same direction at a speed of from 200 to 300 rpm.

8. An apparatus as claimed in claim 4, further comprising means for maintaining the temperature in said feed section and in said flushing section at from 20° to 50° C.

9. An apparatus as claimed in claim 4, wherein said extruder further comprises an after-treatment section downstream of said dehydrating section.

10. An apparatus as claimed in claim 9, wherein said screws have grooves, said grooves in said after-treatment section tapering inwardly in the downstream direction.

11. An apparatus as claimed in claim 4, wherein said screws have grooves, said grooves deepening in the area of said first vent means in said dehydrating section.

* * * * *